(12) United States Patent
Beckett

(10) Patent No.: US 6,416,801 B2
(45) Date of Patent: Jul. 9, 2002

(54) PROCESS FOR CONTROLLING THE SOLIDIFICATION OR CRYSTALLIZATION OF FATS AND FAT-CONTAINING FOODS

(75) Inventor: Stephen Thomas Beckett, Wigginton York (GB)

(73) Assignee: Nestec S.A., Vevey (CH)

(*) Notice: Subject to any disclaimer, the term of this patent is extended or adjusted under 35 U.S.C. 154(b) by 0 days.

(21) Appl. No.: 09/879,740

(22) Filed: Jun. 11, 2001

Related U.S. Application Data

(63) Continuation of application No. PCT/EP99/09567, filed on Dec. 6, 1999.

(30) Foreign Application Priority Data

Dec. 21, 1998 (GB) .............................................. 9828228

(51) Int. Cl.$^7$ ................................................. A23G 1/00
(52) U.S. Cl. ...................... 426/237; 426/606; 426/607; 426/631; 426/417
(58) Field of Search ................................ 426/237, 601, 426/606, 607, 631, 417

(56) References Cited

FOREIGN PATENT DOCUMENTS

| DE | 0496310 | | 7/1992 |
|---|---|---|---|
| GB | 1264511 | * | 2/1972 |
| GB | 2344988 | * | 6/2000 |
| WO | WO 98/30108 | | 7/1998 |
| WO | WO 98/30109 | | 7/1998 |

OTHER PUBLICATIONS

Swern, Editor. 1979. Bailey's Industrial Oil and Fat Products, vol. 1. John Wiley & Sons, New York. p. 190.*
Minifie, 1989. Chocolate, Cocoa, and Confectionery: Science and Technology, $3^{rd}$ edition. Chapman & Hall, New York. p. 91, 650–657.*
Beckett, 1988. Industrial Chocolate Manufacture and Use, $2^{nd}$ edition. Blackie Academic & Professional, New York, p. 156–161.*
Beckett 1988 Industrial Chocolate Manufacture and Use. Blackie Academic & Professional, New York 156–158.*

* cited by examiner

Primary Examiner—Carolyn Paden
(74) Attorney, Agent, or Firm—Winston & Strawm

(57) ABSTRACT

The invention relates to a process for controlling the solidification or crystallization of a fat or a fat-containing food, wherein the solidification or crystallization is carried out under the influence of a magnetic field. The process can be used particularly advantageously where the fat is polymorphic, for example, cocoa butter, and the magnetic field allows the fat to be produced in a particular crystalline form. Thus, a cocoa butter containing product in solid form can be produced, the cocoa butter having been formed directly from a liquid phase in crystal form VI without passing through another crystal form and without the addition of seed crystals.

20 Claims, 9 Drawing Sheets

PROCESS FOR CONTROLLING THE SOLIDIFICATION OR CRYSTALLIZATION OF FATS AND FAT-CONTAINING FOODS

CROSS REFERENCE

This application is a continuation of the U.S. National Stage designation of International Application PCT/EP99/09567 filed Dec. 6, 1999, the content of which is expressly incorporated herein.

FIELD OF INVENTION

The present invention relates to the solidification or crystallization of fats and fat-containing foods, using a magnetic field.

BACKGROUND ART

Fats are widely used in solid or crystalline form in food products. The properties of the foodstuff depends, in part, on which form of fat is solidified or crystallized. Certain fats are polymorphic, i.e., they are capable of solidifying in more than one crystalline form, and the crystal forms may have important effects on the properties of the foodstuff. For example, cocoa butter is polymorphic and six crystal forms have been described (See Talbot in Industrial Chocolate Manufacture and Use (Ed. Beckett), 1994, Chapter 11). Form V is desirable for processed chocolate since this form of cocoa butter gives chocolate snap, texture and gloss. With time, however, form V converts to form VI, which is responsible for the white sheen which may appear on chocolate known as bloom.

WO 98/30108 discloses methods for making chocolate that minimize increases in viscosity associated with tempered chocolate. The method involves adding a seeding agent to molten chocolate and, according to one embodiment, this seeding agent can contain significant amounts of the form VI polymorph on an industrial scale and most of the industry use continuous scraped surface heat exchangers (See Nelson in Industrial Chocolate Manufacture and Use (Ed. Beckett), 1994, Chapter 12), which machines are relatively complex and require critical temperature control processing of fats and fat-containing foods.

Thus, there is a need for improved processing of fats for use in chocolate products.

SUMMARY OF INVENTION

The present invention provides a process for controlling the solidification or crystallization of a fat which comprises applying a magnetic field to the fat at a field strength that is sufficient to promote solidification or crystallization of that fat.

The magnetic field, of the present invention, has a strength of between 220 and 700 Gauss and is produced by a permanent magnet, an electromagnet, or is a radio frequency generated or pulsed magnetic field. It may be applied to the fat or a fat containing food during solidification or crystallization or, instead, may be applied prior to the completion of crystallization when the fat is partially set or is liquid.

Advantages of the present invention include increasing the rate of setting time of the fat and increasing the shelf life of the fat or a fat containing food. Additionally, the process of the present invention produces the fat in one or more stable forms.

The present invention is also provides a process for directly producing cocoa butter in form V or form VI which comprises applying a magnetic field to a liquid phase of cocoa butter at a field strength sufficient to produce form V or form VI cocoa butter.

The magnetic field may be applied to partially set cocoa butter prior to completion of crystallization or instead may be applied to the cocoa butter during solidification or crystallization of liquid cocoa butter. This process increases the setting time of cocoa butter up to 40%.

The cocoa butter of the present invention may be included in a chocolate and the process of applying the magnetic field to the cocoa butter increases the shelf life of the cocoa containing product, i.e., chocolate. Thus, the present invention discloses a cocoa butter containing product in solid form wherein the cocoa butter is formed directly from a liquid phase in crystal form VI without passing through another crystal form.

The present invention is also directed to a method for reducing bloom on chocolate products which comprises converting at least a portion of form V cocoa butter in the chocolate to form VI cocoa butter during production of the chocolate so that bloom resulting from the conversion of form V cocoa butter to form VI cocoa butter in the chocolate after production is reduced.

BRIEF DESCRIPTION OF THE DRAWINGS

Further information on these features of the invention can be found in the drawings wherein.

DETAILED DESCRIPTION OF PREFERRED EMBODIMENTS

Figure 1:
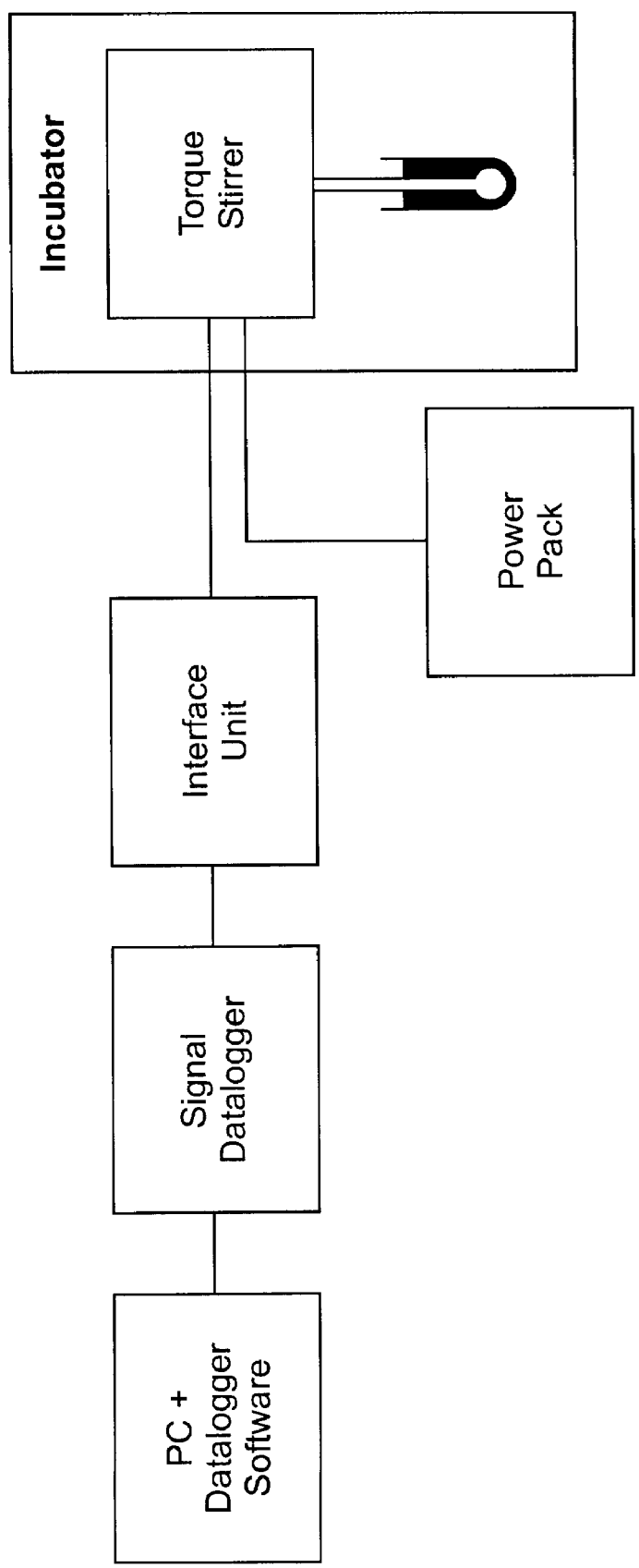
FIG. 1 is a schematic illustration of the equipment set-up used to study cocoa butter crystallization.

According to a preferred embodiment of the invention, the present process can be applied to the crystallization of cocoa butter as an ingredient of such foods as chocolate. As already noted above, cocoa butter is polymorphic and form V converts with time to form VI. It had not previously been thought possible to produce form VI directly by crystallization of liquid cocoa butter or a cocoa butter containing product such as chocolate (See Talbot, Physio-Chemical Aspects of Food Processing, 1995, page 150) but this has now been found to be possible by the application of certain types of magnetic fields to the cocoa butter before or during crystallization.

Use of magnetic fields to influence crystallization enables greater control to be exercised over the crystallization process. Much space is taken up in chocolate factories by cooling tunnels or multi-tier coolers in which the chocolate sets (See Nelson in Industrial Chocolate Manufacture and Use (Ed. Beckett), 1994, Chapter 13) and the expense of this space eliminated if the chocolate could be made to set more rapidly. It has been found according to the present invention that the application of certain magnetic fields can, depending on the type and direction and field strength of the magnetic field, significantly increase the rate of setting of cocoa butter. For example, as illustrated in the examples presented hereinafter, cocoa butter can be induced to set up to 40% more quickly.

The magnetic field according to the invention can be applied in any desired manner including permanent magnets, any type of electromagnet (such as pulsed electromagnets and DC electromagnets) and radio frequency generated magnetic fields. The magnetic field can be applied to the fat or fat-containing food, for example, by the field surrounding the fat or fat-containing food during solidification or crystallization. Alternatively, the magnetic field can be used to treat the liquid or partially set fat or fat-containing food prior to completion of crystallization. The optimum field strength for any particular effect and the manner in which the magnetic field should be applied can be determined in any given case by routine experimentation. The effect of different types of magnetic fields is discussed in more detail in the examples provided herein.

As indicated above, it is surprising that magnetic fields exert an effect on crystallization of fats. Without wishing to be bound by any theory as to how this effect is achieved, some literature exists on a phenomenon known as thermodielectric effect, first documented in 1950 (Costa Ribeiro, Acad, Bras, Sci. An., 22, 325, (1950)). Costa Ribeiro discovered that electric charges are always produced at an interface between a solid and a liquid and may be observed when a phase change is occurring. In addition, charge transfer is produced in other changes of physical state when one phase is a solid.

Charge separation and migration is known to occur in a solution of camphor in CCl4 (Evans, J. Chem. Soc. Faraday Trans I, 80, 2343–2348 (1984)). In the presence of a non-uniform electric field the charges are forced to the surface of the solution. External electric fields must influence a liquid at an interface where the permittivity ($\epsilon$) undergoes an abrupt change and therefore $\Delta \epsilon$ is not zero, as in the bulk solution. As the field is increased, a force is exerted on the surface of the liquid. If the field is strong enough, surface disruption takes place and spikes appear and a nucleation center is formed. As the field is further increased the spike grows into a plate-like crystal. Similarly, ice nucleation is known to be influenced by non-uniform electric fields. This is the inverse of the thermodielectric effect.

Similar effects occur using magnetic fields since the magnetic and electric properties of molecules are analogous. Molecules subjected to applied electric or magnetic fields will experience induced dipole moments or magnetic moments respectively. Phase changes produced by nonhomogenous electric and magnetic fields are known as the Evans effects, and Group theoretical statistical mechanics were carried out (Evans, Mat. Res. Bull., 24, 1557–1565 (1984)) providing the following indications:

1. The electric and magnetic Evans effects depend on the different symmetries on the liquid and crystalline sides of the interface. If there is no symmetry difference, there is no effect.
2. The interface between environments of different point group symmetry is in general forced into that of a lesser symmetry. Thus, a crystal grows into a liquid, a crystal into a gas, etc.
3. The relevant consideration is the point group of the environment on either side of the interface, not the point group of the molecules themselves. In consequence, electric and magnetic Evans effects are expected in molecular solutions, suspensions, colloids, aggregates, etc., where the environmental point groups are different either side of the interface.
4. The mechanism proposed accounts for the fact that the field gradients produce linear force through interaction with the appropriate molecular multipole moment.
5. The point group analysis can be extended straightforwardly to interactions of electromagnetic fields with environments either side of the interface.

EXAMPLES

In the examples that follow, powder x-ray diffraction was carried out using a Philips PW1710 Diffractometer with Cu K$\alpha$ radiation. Incubators used in the studies were Sanyo MIR 152 and operate at a range of ±0.5° C. to the set temperature. The torque stirrer used was a Heidolph RZR 2102 electronic torque stirrer and PC interface unit with speed set by a 2.83V signal from a power pack in all cases. The interface unit used was a Laplace Instruments SPCX-TC, and the signal datalogger was PCXA from Laplace Instruments with software.

Part 1
Crystallization of Cocoa Butter in Applied Magnetic Fields

Example 1

Control

The apparatus illustrated in FIG. 1 was designed in order to study cocoa crystallization.

The power pack set to 2.83V is equivalent to a stirring speed of around 280 rpm. The torque was measured through the signal datalogger and interface unit via the voltage output from the torque stirrer. Cocoa butter (100 ml) placed in a 2 cm diameter sealed test-tube was heated to 80° C. for 1 hour using a water bath. The test tube containing the molten cocoa butter was placed in incubator A at 50° C. with the stirring paddle inserted in the molten cocoa butter, 1 cm from the bottom of the test-tube, and was switched on. The datalogger equipment recorded torque measurements every 60 seconds while incubator A was set to run through the following cycle:

1. 50° C. for 30 minutes.
2. 26° C. for 4 hours
3. 28° C. for 4 hours
4. alternating between 26° C. and 28° C. every four hours during a 24 hour period.

The cooling rate of incubator A (not the cocoa butter) from 50° C. is about 1° C. min$^{-1}$ in the cases of control and pulsed magnets examples and about 0.75° C. min$^{-1}$ for all other examples. The time taken to reach maximum torque during this period was recorded and noted. The test-tube containing the cocoa butter slurry was removed from incubator A and placed in incubator B (not shown) at 20° C. for 24 hours in order to set the cocoa butter.

Following removal of the set cocoa butter from the test tube, visual texture and surface features of the cocoa butter were noted. Powder XRD was carried out on the resulting cocoa butter sample.

Example 2

Crystallization in a Permanent Magnetic Field

Figure 2:
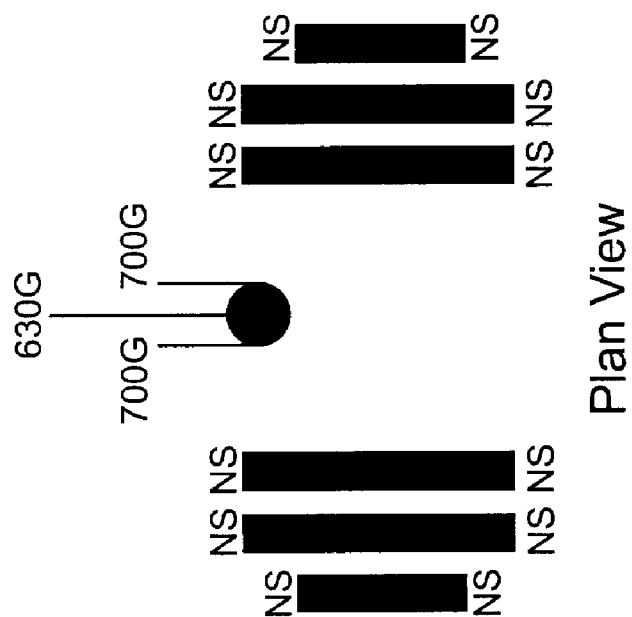
FIG. 2 is an illustration of the permanent magnetic field set-up used in Example 2.
Figure 2:
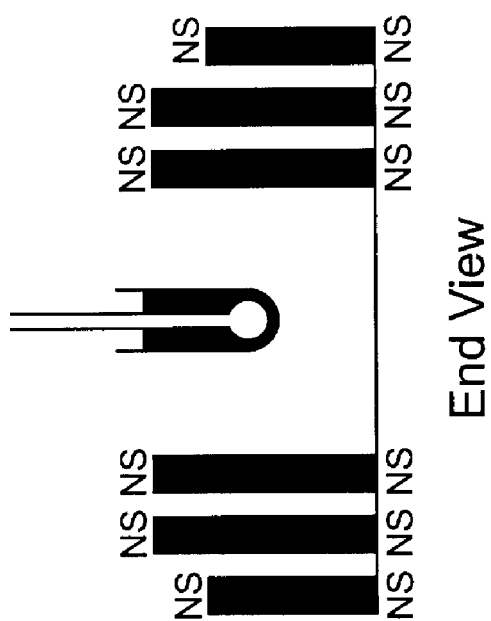

The same procedure as Example 1 was carried out with the addition of permanent magnets (arrangement and field strengths are illustrated in FIG. 2) around the test-tube containing the cocoa butter following placement in incubator A. Stirring and torque measurements were carried out as before. Visual texture and surface features were noted, and Powder XRD was carried out on the resulting cocoa butter sample.

Example 3

Crystallization in a DC Electromagnetic Field

Figure 3:
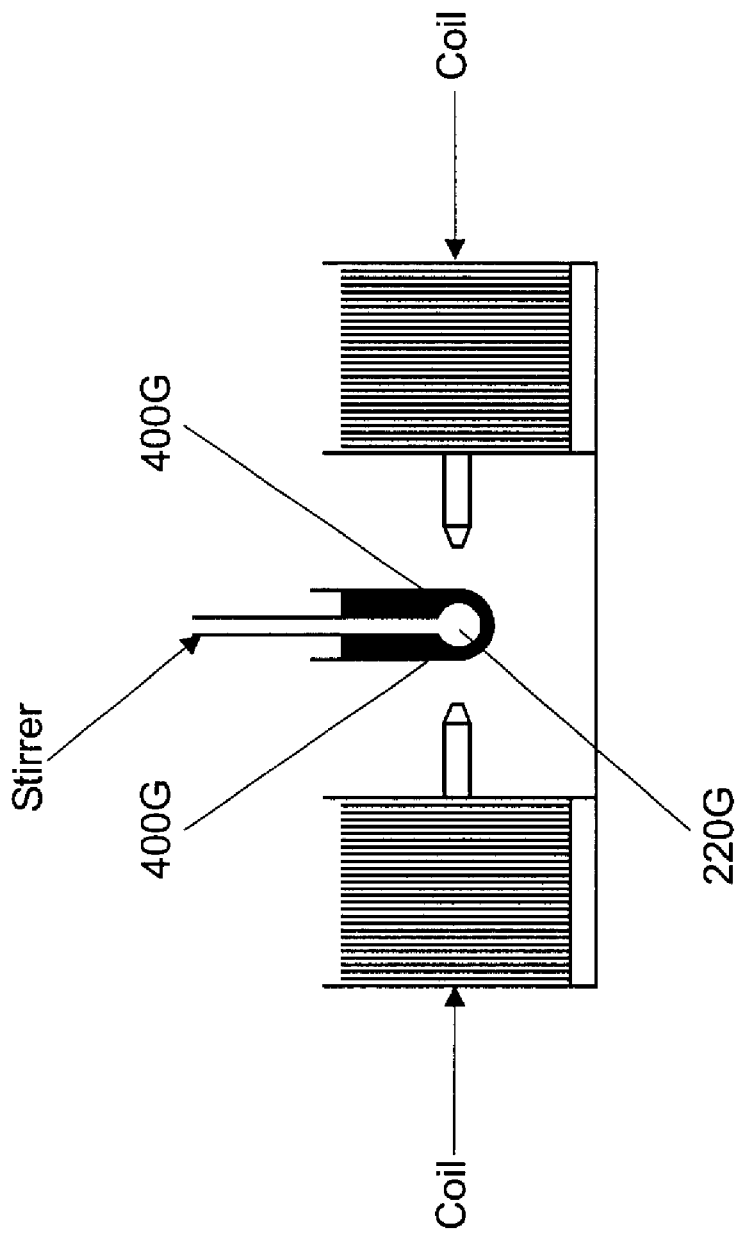
FIG. 3 is an illustration of the DC electromagnetic field set-up used in Example 3.

The same procedure as Example 1 was carried out with the addition of a DC electromagnet (set to operate at 12V and illustrated below in FIG. 3) around the test-tube during stirring of the molten cocoa butter in incubator A. Stirring and torque measurements were monitored and visual texture and surface features of the cocoa butter were recorded. Powder XRD was applied to the resulting cocoa butter sample.

Example 4

Crystallization in an AC Electromagnetic Field

Figure 4:
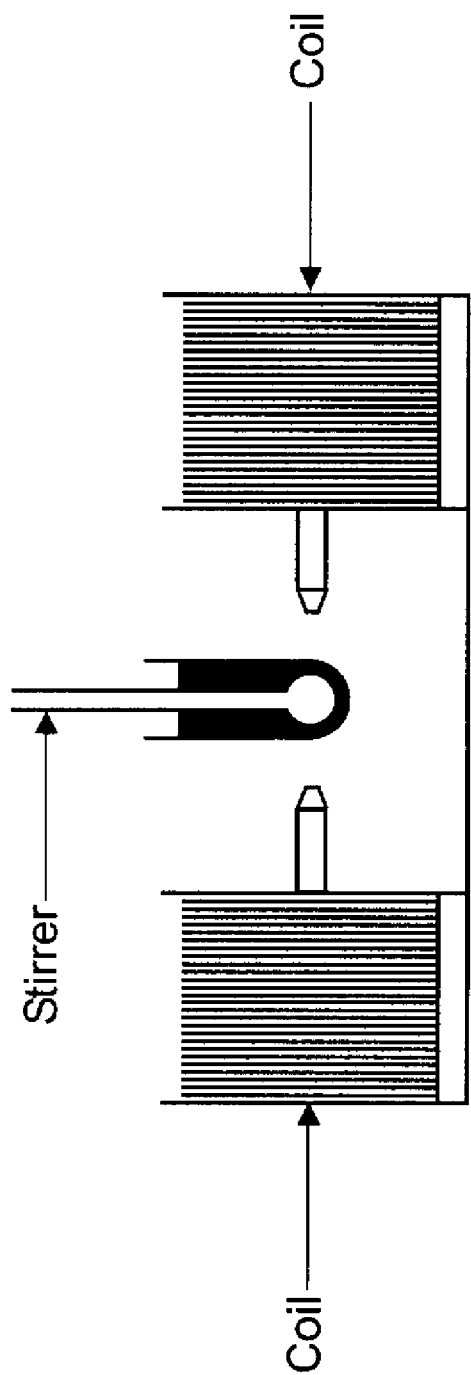
FIG. 4 is an illustration of the AC electromagnetic field set-up used in Example 4.

The same procedure as Example 1 was carried out with the addition of an AC electromagnet (as illustrated below in FIG. 4) around the test-tube during stirring of the molten cocoa butter in incubator A. Stirring and torque measurements were monitored and visual texture and surface features were recorded. Powder XRD was applied to the resulting cocoa butter sample.

Example 5

Crystallization in a Pulsed Field

Figure 5:
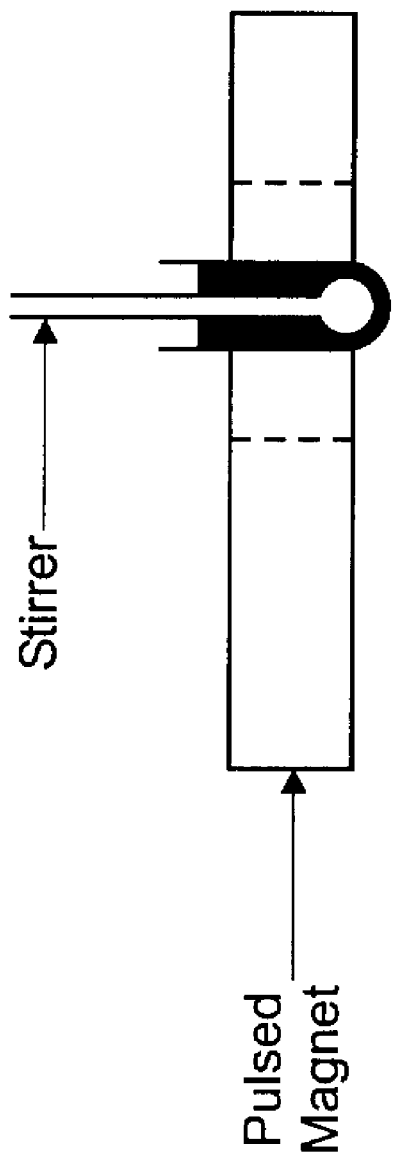
FIG. 5 is an illustration of the pulsed field set-up used in Example 5.

The same procedure as Example 1 was carried out with the addition of a pulsed magnetic field (see FIG. 5) around the test-tube containing cocoa butter during stirring of the molten cocoa butter in incubator A. Stirring and torque measurements were monitored and visual texture and surface features were recorded. Powder XRD was applied to the resulting cocoa butter sample.

TABLE 1

SUMMARY OF APPLIED FIELDS EMPLOYED IN EXAMPLES 1–5

| Example | Field Type | Frequency/Strength | Geometry |
|---|---|---|---|
| 1 | Control | N/A | N/A |
| 2 | Permanent magnets | 700–630 Gauss | N–S, NH Parallel at sides |
| 3 | DC electromagnet | 220–600 Gauss | N–S, NH Parallel at sides |
| 4 | AC electromagnet | 240 kHz | Alternating |
| 5 | Pulsed | 100–160 kHz | N–S, NH Around sample |

N–S is North-South geometry and NJH is Non-homogeneous.

Part 2
Crystallization of Cocoa Butter Following Magnetic Treatment

Example 6

Magnetic Treatment Using Permanent Magnets

Figure 6:
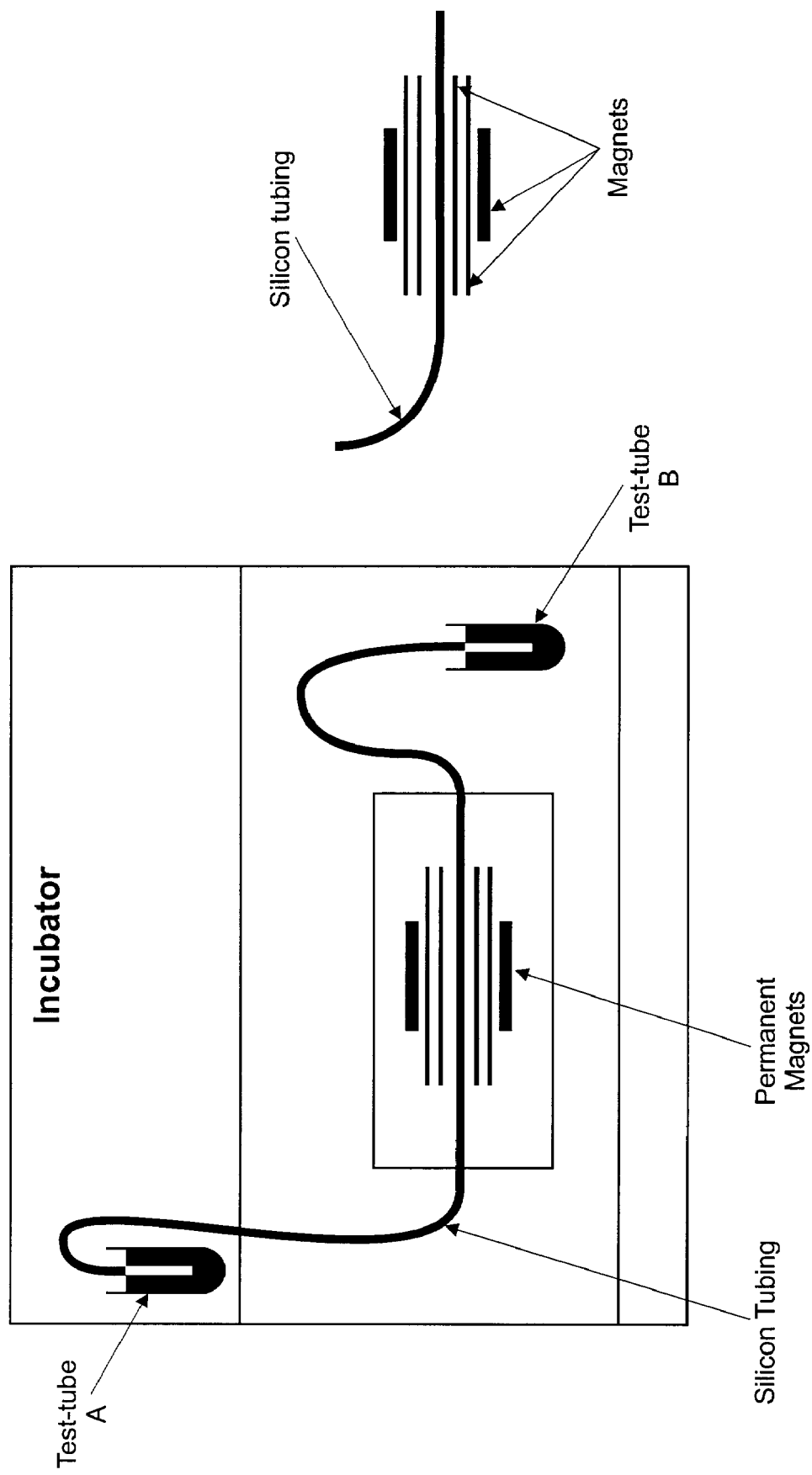
FIG. 6 is an illustration of the apparatus set-up used to apply a permanent magnetic field to molten cocoa butter.

Cocoa butter in a sealed 2.0 cm diameter test-tube was heated at 80° C. for 1 hour. The molten cocoa butter was syphoned through 1m length of 4 mm diameter silicon tubing at 0.12 mmin$^{-1}$ within incubator A at 50° C. from test-tube A into test-tube B as illustrated in FIG. 6.

The silicon tubing passes through the center of the permanent magnets illustrated in FIG. 2. Test-tube B was exchanged with test-tube A and vice-versa, and the syphoning process repeated. This process was repeated once more resulting in the cocoa butter having passed 3 times through the permanent field.

The test-tube containing the cocoa butter then undergoes the same procedure described in Example 1. Visual texture and surface features of the resulting cocoa butter were noted and Powder XRD was carried out on the sample.

Example 7

Magnetic Treatment Using a DC Electromagnet

Figure 7:
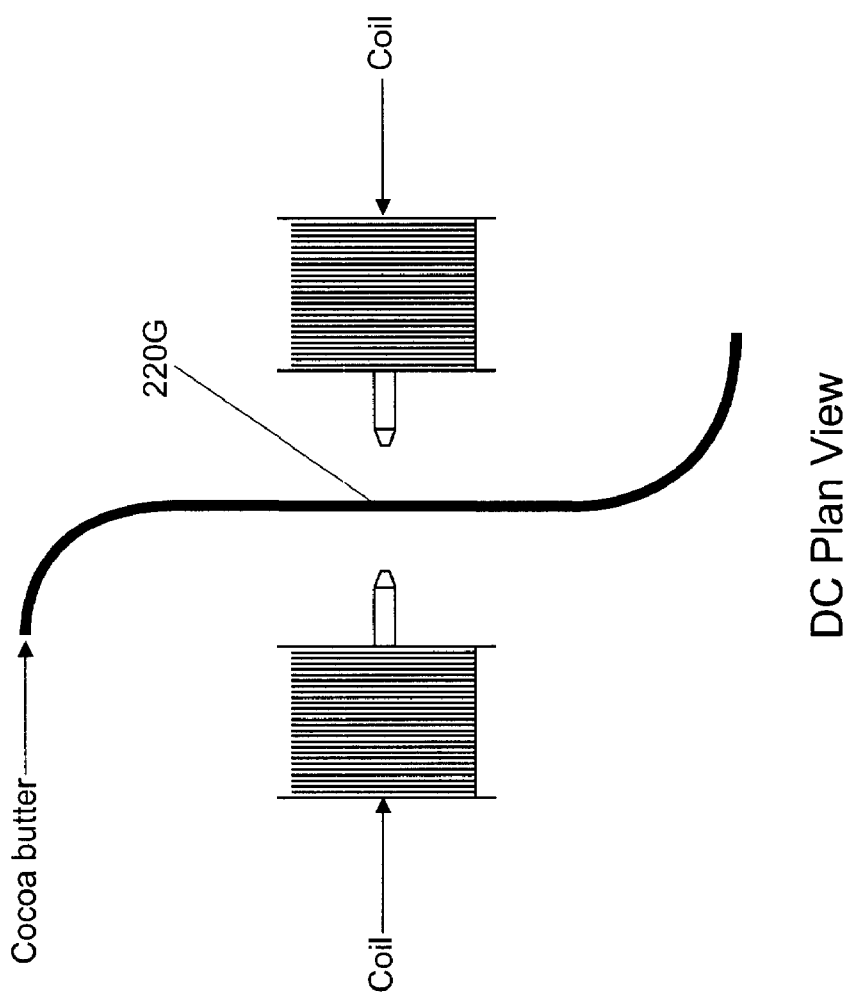
FIG. 7 is an illustration of the apparatus set-up used to apply a DC electromagnetic field to cocoa butter.

The same procedure as Example 6 was carried out with the DC electromagnet in place of the permanent magnets illustrated in FIG. 7. Visual texture and surface features of the cocoa butter were recorded. Powder XRD was applied to the resulting cocoa butter sample.

Example 8

Magnetic Treatment Using an AC Electromagnet

Figure 8:
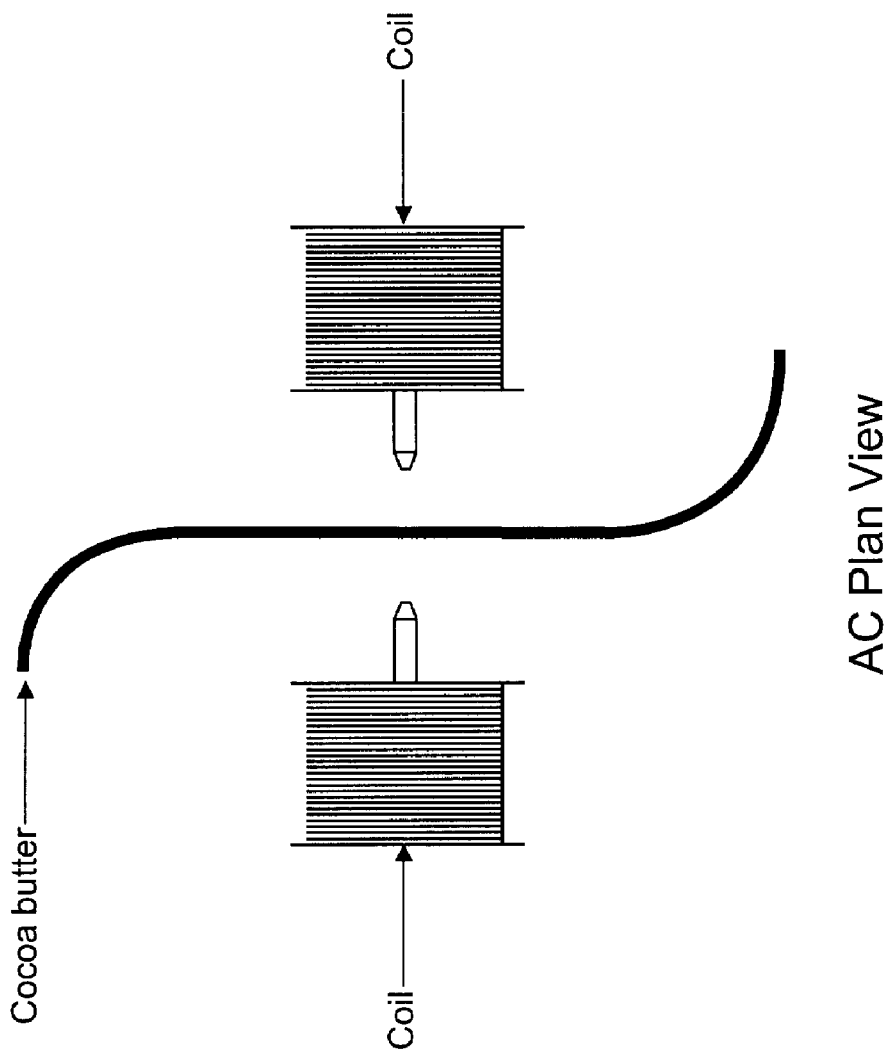
FIG. 8 is an illustration of the apparatus set up used to apply an AC electromagnetic field to cocoa butter.

The same procedure as Example 6 was carried out with the AC electromagnet in place of the permanent magnets as illustrated in FIG. 8. Visual texture and surface features of the cocoa butter were recorded. Powder XRD was applied to the resulting cocoa butter sample.

Example 9

Magnetic treatment Using a Pulsed Magnet

Figure 9:
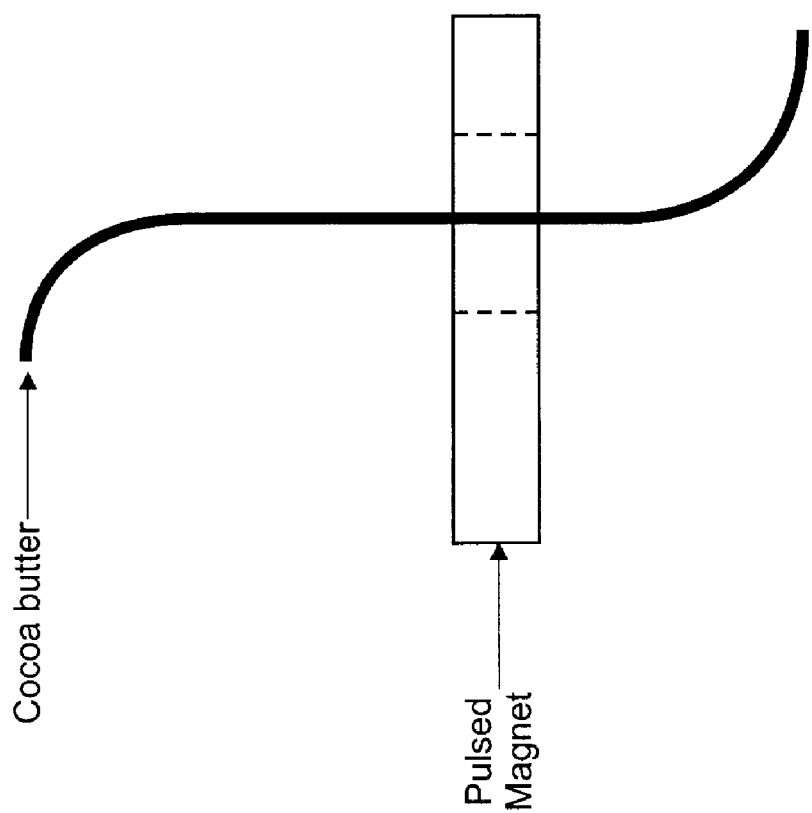
FIG. 9 is an illustration of the pulsed magnetic field set-up applied to molten cocoa butter.

The same procedure as Example 6 was carried out with the silicon tube passing through the center of pulsed magnet as illustrated in FIG. 9. Visual texture and surface features of the cocoa butter were recorded. Powder XRD was applied to the resulting cocoa butter sample.

The types, field strengths and geometries of the magnets used in the examples are summarized in Table 2 below.

TABLE 2

SUMMARY OF APPLIED FIELDS EMPLOYED IN EXAMPLES 6–9

| Example | Field Type | Frequency/Strength | Geometry |
|---|---|---|---|
| 6 | Permanent magnets | 650 G | N–S, NH Parallel at sides |
| 7 | DC electromagnet | 220 G | N–S, NH Parallel at sides |
| 8 | AC electromagnet | 240 kHz | Alternating |
| 9 | Pulsed | 100–160 kHz | N–S, NH Tubing through center |

N–S is North-South geometry and NH is Non-homogeneous.

These examples demonstrate that applied fields enhance the crystallization of cocoa butter. The system illustrated in FIG. 1 and the temperature regime utilized, mimic the tempering stage of chocolate processing that is a necessary prerequisite in chocolate manufacture. These conditions produced cocoa butter in Form V polymorph.

The torque stirrer is set to stir at constant speed applied using a voltage of 2.83V and the PC monitors any changes in torque. The incubator runs through a 24 hour temperature cycle in order to induce cocoa butter crystallization. Therefore, as crystallization commences, the viscosity of the molten cocoa butter increases and the torque required by the stirrer to stir the cocoa butter at the same speed increases, i.e., torque increases with the extent of crystallization.

Several variations in temperature were applied to the cocoa butter samples during crystallization and the regime employed in this study was suitable to obtain Form V cocoa butter.

Stage 1—Melt the cocoa butter to destroy all crystal "memory." This was carried out in a sealed test-tube immersed in a water bath at 80° C., ensuring that water vapor did not come into contact with the cocoa butter.

Stage 2—The test-tube containing clear molten cocoa butter was placed in the incubator at 50° C. with stirring in order to equilibrate the temperature.

Stage 3—The incubator temperature was reduced to 26° C. for 4 hours in order to induce crystallization. Stirring is a vital part of this process since application of a shear force breaks up the cocoa butter seed crystals and increases their number within the molten cocoa butter thus aiding crystallization.

Stage 4—Increasing the incubator temperature to 28° C. for 4 hours is part of the tempering process that melts out all the lower melting forms of cocoa butter leaving Form V seed crystals.

Stage 5—Re-cooling the incubator temperature to 26° C. induces cocoa butter crystal growth of form V on the seed crystals that are present in the melt.

Stages 4 and 5 are repeated for 24 hours forming a cocoa butter slurry which is opaque in appearance. Stirring is removed from the cocoa butter slurry and the test-tube is moved to a second incubator set at 20° C. for 24 hours in order to set and to stabilize the cocoa butter, essentially locking the form in which it has set.

Magnetic fields were applied as follows:

Part 1—The magnetic field was applied during the entire stirring process and remained unchanged during this time. The magnetic field was then removed before transportation of the cocoa butter slurry to the second incubator at 20° C.

Part 2—Magnetic treatment was carried out by passing the molten cocoa butter through tubing which passes through the magnetic field. It was found that the magnetic field effects increase to a maximum at 6 passes, so that 3 passes were chosen to obtain measurable results. The molten cocoa butter was then stirred, with no magnetic fields in place, and the same temperature regime as the control applied to the samples with recording of the torque measurements.

The visual appearance of the resulting cocoa butter samples gives a very good indication of the form of cocoa butter that has resulted from the temperature cycle and applied magnetic fields. A smooth, glossy, yellow texture that shines tends to correspond to well tempered Form V cocoa butter, while white powder or a dull appearance indicates the presence of less stable forms within the cocoa butter, i.e., generally, Forms III or IV.

The time taken to reach maximum torque can be directly removed from the torque measurements obtained during stirring at constant speed. Decrease in time taken to reach maximum torque is taken to indicate enhanced crystallization.

The resulting form of cocoa butter is then determined from powder X-ray diffraction, since each form (and mixtures) can be identified from different characteristic patterns.

TABLE 3

SUMMARY OF THE VISUAL APPEARANCES OF THE COCOA BUTTER SAMPLES

| Applied Field | Example | Visual Appearance |
|---|---|---|
| Control | 1 | very smooth, shiny, yellow and glossy |
| Permanent magnets | 2 | smooth, shiny, yellow and glossy |
| DC electromagnets | 3 | mostly smooth and glossy, some areas of white powder |
| AC electromagnets | 4 | smooth, shiny, yellow and glossy |
| Pulsed | 5 | mostly smooth and glossy, some areas of white powder |
| Permanent magnets | 6 | very smooth, shiny and glossy, with some areas of white powder |
| DC electromagnets | 7 | very smooth, shiny, yellow and glossy |
| AC electromagnets | 8 | smooth, glossy and some areas of white powder |
| Pulsed | 9 | very glossy, smooth, yellow and shiny |

TABLE 4

SUMMARY OF TIME TAKEN TO REACH MAXIMUM TORQUE MEASUREMENTS

| Applied Field | Example | Time taken to crystallize (hours) |
|---|---|---|
| Control | 1 | 21 |
| Permanent magnets | 2 | 15 |
| DC electromagnets | 3 | 16 |
| AC electromagnets | 4 | 19 |
| Pulsed | 5 | 16 |
| Permanent magnets | 6 | 14 |
| DC electromagnets | 7 | 14 |
| AC electromagnets | 8 | 13 |
| Pulsed | 9 | 17 |

TABLE 5

SUMMARY OF THE POWDER X-RAY DIFFRACTION DATA

| Applied Field | Example | Cocoa Butter Form |
|---|---|---|
| Control | 1 | 100% Form V |
| Permanent magnets | 2 | 100% Form V |
| DC electromagnets | 3 | 25% Form VI: 75% Form V |
| AC electromagnets | 4 | 100% Form V |
| Pulsed | 5 | 20% Form VI: 80% Form V |
| Permanent magnets | 6 | 100% Form V |
| DC electromagnets | 7 | 100% Form VI |
| AC electromagnets | 8 | 100% Form V |
| Pulsed | 9 | 100% Form VI |

The visual observations of the cocoa butter samples are shown in Table 3 above. There were clearly visible differences in the cocoa butter samples obtained under different applied field conditions of crystallization. As would be expected, the Control (Example 1) resulted in smooth shiny and glossy cocoa butter (Form V). In most cases, the cocoa butter sample obtained was of similar quality, however, there were some examples (i.e., 3, 5, 6, and 8) where there were white, powdery circular areas throughout the shiny, glossy areas of the sample. It was assumed that some lower melting forms of cocoa butter had been obtained in addition to Form V cocoa butter. In addition, Examples 7 and 9 resulted in cocoa butter samples that were particularly glossy and shiny compared to other samples.

The time taken to crystallize, measured as the time taken to reach maximum torque, for each example is shown in Table 4. The Control was repeated 5 times and in each case gave the time taken to crystallize as 21 hours. This was taken to be the standard under "no field" conditions, to which all subsequent "applied field" examples would be compared.

In all applied field cases, under both conditions of magnetic field application, the crystallization time is enhanced. The least affected is the cocoa butter under the AC electromagnet field conditions, which measures time to crystallize as 19 hours. Other crystallization times from Part 1 (Examples 2, 3, and 5 under permanent magnetic, DC electromagnetic and pulsed magnetic field conditions, respectively) are 15 or 16 hours to reach maximum torque which is an enhancement of crystallization by around 20–30%.

In part 2, the times taken to crystallize are enhanced to a greater degree; magnetic treatment of the cocoa butter using a pulsed magnetic field shows a crystallization time enhancement of around 20%; all other magnets enhance crystallization time by about 30–40%. These results are very significant since they indicate that processing times for tempering can be reduced significantly.

Powder X-ray diffraction is used to identify the polymorph of the cocoa butter. As would be expected, the Control (Example 1) has a XRD trace that corresponds to 100% Form V cocoa butter. Cocoa butter samples obtained from exposure to permanent magnetic fields (Examples 2 and 6) during crystallization also exhibit typical 100% Form V cocoa butter. Similarly, AC electromagnetic field exposure (Examples 4 and 8) does not appear to alter the Form of cocoa butter obtained from Form V.

The XRD data from cocoa butter obtained from Examples 3 and 5 (DC electromagnet and pulsed field exposure, respectively) are typical of mixed cocoa butter forms in the ratios indicated, which explains the white powdery morphology observed in these samples. The most interesting and possibly significant results are however, from Examples 7 and 9 (DC electromagnet and pulsed magnet field exposure, respectively) since the XRD results indicate that 100% Form VI is obtained in both cases. This is also in agreement with the observed morphology which is particularly shiny, glossy cocoa butter samples.

Applied magnetic fields reduce the length of time cocoa butter requires to crystallize whether applied to the stirring system during crystallization or applied prior to stirring via a flowing system, by up to 40% in some cases depending on the particular field used. The obvious advantages are to be gained in decreased chocolate production times. The cocoa butter form may be modified from Form V to VI following magnetic treatment prior to stirring which is of particular use in the chocolate manufacturing industry since the ability to produce Form VI cocoa butter in chocolate would remove fat bloom problems and thus enhances shelf life.

What is claimed is:

1. A process for controlling the solidification or crystallization of cocoa butter or a cocoa butter-containing food which comprises applying a magnetic field to the liquid phase of the cocoa butter at a field strength sufficient to produce form V or form VI cocoa butter directly from the liquid phase.

2. A process according to claim 1 wherein the magnetic field is produced by a permanent magnet, or an electromagnet or is a radio frequency generated magnetic field.

3. The process according to claim 2 wherein the magnetic field has a strength of between 220 and 700 Gauss and is produced by a permanent magnet or an electromagnet or is a radio frequency generated or pulsed magnetic field having a frequency between 100 and 240 kHz.

4. A process according to claim 1 wherein the cocoa butter-containing food is chocolate.

5. A method for reducing bloom on chocolate which comprises applying a magnetic field to either cocoa butter in a liquid phase to directly convert at least a portion to form VI without passing through another form or to cocoa butter in form V converting at least a portion to form VI during production of the chocolate so that bloom resulting from the conversion of form V cocoa butter to form VI cocoa butter in the chocolate after production is reduced.

6. A process according to claim 5 wherein the magnetic field is produced by a permanent magnet, or an electromagnet or is a radio frequency generated magnetic field.

7. The process according to claim 6 wherein the magnetic field has a strength of between 220 and 700 Gauss and is produced by a permanent magnet or is a radio frequency generated or pulsed magnetic field having a frequency between 100 and 240 kHz.

8. A process according to claim 5 wherein the magnetic field is applied to the cocoa butter or cocoa butter-containing food during solidification and/or crystallization or is used to treat the liquid or partially set cocoa butter or cocoa butter-containing food prior to completion of crystallization.

9. A process for increasing the shelf life of a cocoa butter or cocoa butter-containing food by converting a cocoa butter to form VI which comprises applying a magnetic field to cocoa butter or cocoa butter-containing food at a field strength sufficient to promote solidification or crystallization of the cocoa butter in form VI.

10. A process according to claim 9 wherein the magnetic field is produced by a permanent magnet, or an electromagnet or is a radio frequency generated magnetic field.

11. The process according to claim 10 wherein the magnetic field has a strength of between 220 and 700 Gauss and is produced by a permanent magnet or an electromagnet or is a radio frequency generated or pulsed magnetic field having a frequency between 100 and 240 kHz.

12. A process according to claim 9 wherein the magnetic field is applied to the cocoa butter or cocoa butter-containing food during solidification and/or crystallization or is used to treat the liquid or partially set cocoa butter or cocoa butter-containing food prior to completion of crystallization.

13. A process according to claim 9 wherein the cocoa butter-contaioning food is chocolate.

14. A process of increasing the rate of setting of cocoa butter or cocoa butter-containing food by at least 10% which comprises applying a magnetic field to cocoa butter or cocoa butter-containing food at a field strength sufficient to promote solidification or crystallization of the cocoa butter prior to completion of crystallization.

15. A process according to claim 14 wherein the magnetic field is produced by a permanent magnet, or an electromagnet or is a radio frequency generated magnetic field.

16. The process according to claim 15 wherein the magnetic field has a strength of between 220 and 700 Gauss and is produced by a permanent magnet or an electromagnet or is a radio frequency generated or pulsed magnetic field having a frequency between 100 and 240 kHz.

17. A process according to claim 14 wherein the magnetic field is applied to the cocoa butter or cocoa butter-containing food during solidification and/or crystallization or is used to treat the liquid or partially set cocoa butter or cocoa butter-containing food prior to completion of crystallization.

18. A process according to claim 14 wherein the cocoa butter-containing food is chocolate.

19. A cocoa butter containing product in solid form VI with no bloom, the cocoa butter having been formed directly from a liquid phase in crystal form VI without having passed through another crystal form.

20. A cocoa butter containing product in solid form VI with no bloom, the cocoa butter having been formed directly from a liquid phase in crystal form VI without having passed through another crystal form and without addition of seed crystals.

* * * * *

UNITED STATES PATENT AND TRADEMARK OFFICE
CERTIFICATE OF CORRECTION

PATENT NO. : 6,416,801 B2
DATED : July 9, 2002
INVENTOR(S) : Beckett

It is certified that error appears in the above-identified patent and that said Letters Patent is hereby corrected as shown below:

Title page,
Item [56], References Cited, FOREIGN PATENT DOCUMENTS, change "DE 0496310" to -- EP 0496310 --.
OTHER PUBLICATIONS, add the following references:
-- Dumitru, M., "Operating conditions of some liquid crystals in interactions with physical fields", 1998, SPIE - Int. Soc. Opt. Eng., Vol. 3319, pp. 325-333.
Burchard et al., "Biological Effects of Electric and Magnetic Fields on Productivity of Dairy Cows", 1996, Journal of Dairy Science, Vol. 79, no. 9, pp. 1549-1554.
Mori, Solidification Problems in Preparation of Fats, 1988, pp. 430-433.
Antipova et al., "Production of chocolate mass introducing phosphatide concentrate obtained by hydration of soy oil under action of electromagnetic activation", 1995, ABSTRACT.
"High Load Plastic Lubricate Preparation Heat Oil Specified Soap Cooling Melt Strong Magnetic Field", 1977, ABSTRACT.
Lapshev, "Transesterification of beef fat glycerides under the action of a constant magnetic field", Probemy Kachestva I Biolgicheskoi Tsennosti Pschevykh Productov, 1979, pp. 210-215. --.

Column 10,
Line 18, after "produced by a permanent magnet", insert -- or an electromagnet --.
Line 46, change "butter-contaioning" to -- butter-containing --.

Signed and Sealed this

First Day of April, 2003

JAMES E. ROGAN
*Director of the United States Patent and Trademark Office*